(12) United States Patent
Gallegos (10) Patent No.: US 11,944,045 B2
(45) Date of Patent: Apr. 2, 2024

(54) LIQUID CONTAINMENT AND FOCUS FOR SUBTERRANEAN CAPILLARY IRRIGATION

(71) Applicant: Joseph Dominic Gallegos, Long Beach, CA (US)

(72) Inventor: Joseph Dominic Gallegos, Long Beach, CA (US)

(73) Assignee: DROUGHT DIET PRODUCTS, Fresno, CA (US)

( * ) Notice: Subject to any disclaimer, the term of this patent is extended or adjusted under 35 U.S.C. 154(b) by 0 days.

(21) Appl. No.: 15/904,425

(22) Filed: Feb. 26, 2018

(65) Prior Publication Data

US 2018/0177146 A1    Jun. 28, 2018

Related U.S. Application Data

(63) Continuation-in-part of application No. PCT/US2016/048791, filed on Aug. 25, 2016.

(51) Int. Cl.
*E02B 1/00* (2006.01)
*A01G 25/06* (2006.01)

(52) U.S. Cl.
CPC .................. *A01G 25/06* (2013.01)

(58) Field of Classification Search
CPC ........ A01G 25/06; A01G 25/00; A01G 25/02; A01G 25/023; A01G 25/026; A01G 9/02; A01G 27/008; E02B 13/00; E02B 1/005; E02B 11/005; E03F 1/002; B01D 35/02
See application file for complete search history.

(56) References Cited

U.S. PATENT DOCUMENTS

| | | | |
|---|---|---|---|
| 281,064 A * | 7/1883 | Hendley | H01F 27/025 174/101 |
| 307,360 A | 10/1884 | Tweddell et al. | |
| 370,283 A * | 9/1887 | Ries | B60M 1/34 191/23 R |
| 502,842 A * | 8/1893 | Zell | G01D 11/245 191/48 |
| 527,871 A * | 10/1894 | Morrow | E04D 3/405 138/116 |
| 548,786 A * | 10/1895 | Nichols et al. | G01D 11/245 191/26 |

(Continued)

*Primary Examiner* — Edwin J Toledo-Duran
(74) *Attorney, Agent, or Firm* — Diederiks, & Whitelaw, PLC.

(57) ABSTRACT

This invention is related to a gravity flow, multipurpose bidirectional nonpressurized climate smart subirrigation conduit apparatus for managing soil moisture and growing plants. The subirrigation conduit apparatus creates a suspended virtual water table at the desired buried depth, thus creating a anaerobic saturated zone and a capillary fringe. The capillary fringe is describe in the art as a moisture zone that has perfect air and moisture mixture for plant growth, can also be used to irrigate with high turbidity obstruction liquids such as precipitation runoff and alternative waters such as untreated greywater. When too much water is present within the landscape, the Multipurpose bidirectional nonpressurized climate smart subirrigation conduit apparatus can be used in reverse flow to drain the landscape. Bidirectional nonpressurized flow is achieved by gravity water equalization thus cutting any need for energy consumption.

6 Claims, 5 Drawing Sheets

(56) References Cited

U.S. PATENT DOCUMENTS

| | | | | |
|---|---|---|---|---|
| 1,014,892 A * | 1/1912 | Mires | B60M 1/343 | 191/23 R |
| 2,052,020 A * | 8/1936 | Black | A01G 25/06 | 138/158 |
| 2,536,196 A | 1/1951 | MacLeod | | |
| 2,653,449 A | 9/1953 | Stauch | | |
| 3,183,674 A * | 5/1965 | Boschen | E02B 13/00 | 405/37 |
| 3,332,250 A * | 7/1967 | Logan | F16L 1/036 | 405/126 |
| 3,491,023 A * | 1/1970 | McCormick | B01F 23/23122 | 210/923 |
| 3,563,038 A * | 2/1971 | Healy et al. | E02B 11/005 | 210/486 |
| 3,642,091 A * | 2/1972 | Nohara | H04R 1/345 | 181/150 |
| 3,774,850 A * | 11/1973 | Zeman | A01G 25/02 | 239/542 |
| 4,016,727 A * | 4/1977 | Osaka | E02B 11/005 | 405/48 |
| 4,020,639 A * | 5/1977 | Nagare | F16L 9/127 | 405/36 |
| 4,060,991 A | 12/1977 | Reese | | |
| 4,102,135 A * | 7/1978 | Auriemma | E02B 11/005 | 405/43 |
| 4,117,685 A * | 10/1978 | Skaife | E02B 13/00 | 405/38 |
| 4,140,421 A * | 2/1979 | Lloyd | A01G 25/06 | 210/455 |
| D264,116 S * | 4/1982 | Soderstrom | D23/266 | |
| 4,389,138 A * | 6/1983 | Soderstrom | E02B 11/005 | 405/36 |
| 4,650,367 A * | 3/1987 | Dietzler | F16L 9/18 | 138/172 |
| 4,720,209 A * | 1/1988 | Iams | E03F 1/002 | 405/36 |
| D317,358 S * | 6/1991 | Spendrup | D23/393 | |
| 5,374,138 A * | 12/1994 | Byles | A01G 25/06 | 405/38 |
| 5,558,461 A * | 9/1996 | Van Dorp | E02B 11/00 | 47/17 |
| 5,564,857 A * | 10/1996 | Schluter | E02B 11/005 | 405/36 |
| 5,702,593 A | 12/1997 | Horsley et al. | | |
| 5,785,454 A * | 7/1998 | Ringdal | A01G 25/06 | 405/45 |
| 5,938,372 A * | 8/1999 | Lichfield | A01G 25/06 | 405/36 |
| 6,167,916 B1 * | 1/2001 | Gustafson, Jr. | F16L 9/19 | 405/149 |
| 6,436,283 B1 * | 8/2002 | Duke | E03B 3/02 | 210/748.11 |
| 6,814,866 B1 * | 11/2004 | Potts | B09C 1/002 | 210/612 |
| 6,969,464 B1 * | 11/2005 | Potts | E03F 1/002 | 405/36 |
| 7,207,747 B1 * | 4/2007 | England | E02B 11/005 | 210/170.03 |
| 9,974,248 B2 * | 5/2018 | Lam | A01G 9/033 | |
| 10,591,091 B1 * | 3/2020 | Waszak | F16L 9/22 | |
| 2002/0017055 A1 * | 2/2002 | Nalbandian | A01G 27/006 | 47/48.5 |
| 2003/0070985 A1 * | 4/2003 | Potts | E03F 1/002 | 210/616 |
| 2003/0173293 A1 * | 9/2003 | Potts | E03F 1/002 | 210/616 |
| 2004/0099586 A1 * | 5/2004 | Imoto | E03F 5/08 | 210/85 |
| 2005/0100412 A1 * | 5/2005 | Houck | E03F 3/046 | 405/125 |
| 2006/0165489 A1 * | 7/2006 | Seo | E21F 16/02 | 405/150.1 |
| 2008/0190045 A1 * | 8/2008 | Janesky | E02D 31/02 | 52/169.5 |
| 2011/0314748 A1 * | 12/2011 | Smith | E04D 13/0767 | 52/12 |
| 2015/0230416 A1 * | 8/2015 | Lo | A01G 9/02 | 47/79 |
| 2016/0286739 A1 * | 10/2016 | Buff | F16L 55/027 | |

* cited by examiner

LIQUID CONTAINMENT AND FOCUS FOR SUBTERRANEAN CAPILLARY IRRIGATION

BACKGROUND DESCRIPTION

The present invention is a new way to approach irrigation with a multipurpose bidirectional nonpressurized climate smart subirrigation apparatus that one or more aspects increase water utilization effectiveness, increase optimal growing conditions for higher crop yields, higher biomass, prevents water runoff and leaching into rivers, oceans and groundwater, prevents water lost to deep percolation, method to eliminate weed seed germination, prevent weed growth, and decrees fungi growth. The apparatus has the novel ability to handle high turbidity obstruction liquid such as storm water and untreated greywater or used in reverse as a drainage tile pipe when too much water is present from rising water table or heavy precipitation saturation.

Definitions

Water Utilization Effectiveness: a measurement of the amount of irrigations water applied, that is up taken by the plant (transpiration) compare to the amount lost to environmental leakage such as evaporation, deep percolation or competing plants such as weeds. 100% Water Utilization Effectiveness is when 100% of the water applied to an irrigated landscape is equal to the amount of water up taken by the intended plant with no water lost to environmental leakage.

Distribution Efficient Uniformity (DEU): Traditionally irrigation distribution components, such as sprinklers have been measured by their ability to distribute surface water evenly over the spray area. Meaning that in a given circular distribution pattern 75% or more of the area is receiving the same amount of water on a non-windy day would equal 75% DEU. The other 25% of the circular distribution received too little or too much water.

Obstruction Liquid: liquid that has contaminants such as soil, minerals, untreated greywater with lint, greywater soap scum or high turbidity. Such contaminant will clog up irrigation systems with small orifice emitters.

Landscape: is used as a general term to mean any land area that is planted with a desirable cultivated plant, this includes but not limited to urban decorative landscapes, farm production agricultural landscapes and grass lands.

Invented apparatus: present invention "Liquid containment and focus for subterranean capillary irrigation"

Water banking: Increasing the water moisture content within the soil for use by the desired cultivated plants or added to increase gravity water flow to the water table.

Gravity water: General term used for water that percolates through the soil on its way to the water table.

Untreated graywater: is greywater that has not been treated. It has a high percentage of consumer products used in the shower, bath and laundry such as soap, detergents, shampoos, conditioners, softeners, turbidity particles like lint, and soil from washing clothes. In whole called Greywater scum for its tendency to coat pipes with a layer of slimy film. Such water will clog up traditional pressurized irrigations systems, and geotextile materials pores. Untreated greywater is the opposite of clean greywater.

Clean greywater: is greywater that has been clean to a pure quality with no turbidity or signs of consumer products used in shower, baths or laundry. The greywater turbidity is equal to drinking water. Clean greywater requires filters, filter media and energy to produce, also requires a advance mechanical equipment processes. Clean greywater is suitable for discharge by traditional pressurized irrigation system with small orifices.

BACKGROUND

In past years water has always been abundant. There was little need for prior art to focus on irrigation water utilization effectiveness when there was an abundance of water available. This led most irrigation prior art to focus on water distribution efficient uniformity methods. Water is now in demand and environment changes such as global regional droughts have put stresses on water resources and water sustainability. Environmental changes have also increase changes in precipitation, ranging from high down pours in short periods where the landscape cannot absorb the sudden down pour to back-to-back precipitation events causing full ground saturation and rising water table. Both types of precipitation events cause flooding, mud flows, and capacity limits on drainage channels, and rivers.

When surface water supplies are low during drought periods, ground water is often pump to the surface for irrigation. In recent times, the demand for well water has increase. The negative environmental effect are lower water tables to deeps never seen before, or to the point of depletion. Deeper water tables, require deeper wells, that also require more energy cost to pump water up from these depths.

Research has shown that 70% to 80% of all water used regionally is for agricultural applications and in urban areas 50% of the potable water is used for landscape irrigation. Therefor small increase in irrigation water utilization efficiency for either agriculture or urban landscape (hereon both agriculture and urban landscape used interchangeable as landscape) have significate water and energy savings potential.

There is a globally need for a simple energy and water multipurpose climate smart irrigation apparatus, that has no moving parts or parts requiring maintenance and replacement. Requires no energy to operate or energy for pretreatment of water to distribute and, increases water utilization effectiveness over water distribution efficiency. The climate smart multipurpose ability to be used as a irrigate system during dry periods, drainage tile in times of over saturated and as an opportunistic irrigation device by using high turbidity alternative waters such as precipitation, snow pack river runoff and untreated greywater.

In general plant irrigation has mainly been performed on the soil surface through both pressurized systems and by flood irrigation. In both cases the irrigated water process is subject to evaporation lost. Great amount of research has been performed to determine how to measure the total amount of water to apply on the surface for healthy plant growth. This volume of water to apply is express as the Evapotranspiration factor, and is express in the equation ETo where "E" is for Evaporation loss and accounts for 25% to 60% of the water applied and "T" is for plant uptake known as Transpiration, the "o" is the specific plant species needs above or below the baseline crop used across the regions for comparison. One of the main purposes of the present invention is to eliminate the "E" (Evaporation) in the ETo equation. The invented apparatus accomplishes this by applying irrigated water far below the surface and below the root zone level and away from the effect of surface evaporation and soil solar vaporization.

Other disadvantages of surface irrigation that the current apparatus will show to mitigate in part include irrigations surface runoff into streams, rivers, lakes and oceans; weed seed germinations, weed growth support and fungi diseases cause by excess dew from surface moisture.

Drip tape and drip tube are the most used current subirrigation types today and both require water pressure to operate. In addition we are introduce to prior art innovation subsurface irrigations apparatus from Byles (U.S. Pat. No. 5,374,138 A), Nalbandian et al (U.S. Application No. 2002/0017055 A1), Lichfield (U.S. Pat. No. 5,938,372 A), Reese (U.S. Pat. No. 4,060,991 A), and Skaife (U.S. Pat. No. 4,117,685 A) which all require pressurized water delivery systems. Such pressurized systems increase energy cost and limit use to where power is available. The current apparatus takes the novel approach of creating a design to allow bidirectional water to flow unobstructed by gravity the distance of the apparatus connected end on end up to 5 miles in length, thus eliminate the need for an energy producing pressurized system.

Other issue with current subsurface applications such as drip tape, drip hose, Byles (U.S. Pat. No. 5,374,138 A), Lichfield (U.S. Pat. No. 5,938,372 A), and Skaife (U.S. Pat. No. 4,117,685 A), is that the water emitters orifices are small and thus subject to clogging by soil particles, mineral buildup, root intrusion and untreated greywater scum. Lichfield makes an effort to avoid root intrusion by incorporating a fiber mesh to discourage roots near the orifices but does not solve soil particles intrusion, and Skaife uses a filter mesh to avoid soil intrusion into the orifice. Experience has shown that even if manufactures of drip tape, drip hose, and the strategies of Byles, Lichfield and Skaife will try to prevent orifice clogging, it will occur somewhere along the distribution line from internal turbidity water or external from back flow negative pressure causes, in Byles, Lichfield and Skaife, the orifices will clog with the use of untreated greywater scum. The invented apparatus uses large bidirectional seep hole emitters that allow for bidirectional obstruction liquid flow. Large volume of soil particles are allowed bidirectional flow through the bidirectional seep holes. Root intrusion in manage by a creative method of placing the current apparatus away from the root zone so that plants feed from the moisture plume created by the invented apparatus. If roots do find themselves near the invented apparatus the self-leveling saturated channel is an anaerobic region, that roots will avoid due to absence of air. The novel use of extremely large bidirectional seep holes compared to traditional unidirectional small emitters orifices, allows for the innovative bidirectional obstruction liquid flow such as greywater scum and other high turbidity water with soil particles. If soil does enter the bidirectional liquid channel chamber through a bidirectional seep hole, the soil particles are so small to the bidirectional seep holes that liquid still flows. The apparatus also uses the novel use of a plethora of bidirectional seep holes along the shared bidirectional seep hole wall to allow liquid to enter the self-leveling saturated channel from multiple ports and still create a water equilibrium along the full length of the self-leveling saturated channel, therefor the apparatus has an liquid irrigation distribution system not subject to one point of failure.

Current subsurface irrigation systems are subject to accidental puncher damage from humans and animals. Drip tape and drip tube both are easy puncher due to their thin walls and manufacture material such as polyethylene or polypropylene and are not suitable for turf areas where lawn signs and goalie nets spikes are used. In Byles (U.S. Pat. No. 5,374,138 A) and Lichfield (U.S. Pat. No. 5,938,372 A) are both place near the surface for turf grass. In Byles, the porous distribution channel can be puncher and the deflector can be disformed thus preventing lateral water deflection and in Lichfield, the distribution tubing and distribution matting are both made with materials that are easy to accidental punchers. The current apparatus is intended to feed plants from a concentrated focus vertical moisture plume that can reach 22 inches high, thus the innovative approach is to place the current apparatus up to 18 inches below the root zone which can be 12 inches to 60 inches below the surface. This puts the apparatus at 30 inches to 78 inches below the surface, far from human error. In addition the current apparatus is made by extrusion process with harder plastic types such as ABS and PVC, both with thick walls that prevent accidental punchers by deflecting hard objects.

Besides evaporation, the current conventional irrigation practices have one additional problem that is water lost to deep percolation. Conventional irrigation practices compensates for uneven irrigation water distribution efficiency by over applying water. Thereby not only is irrigation water lost to evaporation, some is lost to runoff and the addition volume of water is lost to deep percolation beyond a depth that plant roots can use. Deep percolation also has the increase environmental damages of soil leaching of harmful chemicals such as fertilizers, pesticides and other chemicals into the ground water, thus causing groundwater contamination.

In prior art, Hollan (U.S. Pat. No. 9,161,496 B2) and in a project done for United States Department of Agriculture Project number MICL02340 2014-2019, perform by Michigan State University called Soil Water Retention Technology (SWRT). Both of these prior arts show that subsurface water capture and holding capability can be an partial tool to prevent some deep percolation with a water retention apparatus. Hollan and SWRT are subsurface catch basins, they both capture water as it percolates through the soil above their art. Water can be applied as surface irrigation or by precipitation, thus some surface water not directly above these prior art will flow past these arts and into the ground water. Holland and SWRT also do not address the effects on over watering, changes in water tables, or placement of their arts in contour landscapes, in addition both are not design to prevent water from flowing to the lowest point, thereby leaving the higher areas dry. In Byles (U.S. Pat. No. 5,374,138 A) there is an attempt to slow deep percolation, but not stop it with the use of a deflector that Byles states will push the water lateral before succumbing to downward gravity flow and deep percolation, Nalbandian et al (U.S. Application No. 2002/0017055 A1) is a closed containment and design for pots and commercial nursery applications, over watering creates excess water at the bottom of the pot, Lichfield (U.S. Pat. No. 5,938,372 A) uses a underlayment of water resistant material to slow the flow of irrigated water temporary near the emitters, but also encourages poking holes into the underlayment to increase drainage. In Reese (U.S. Pat. No. 4,060,991 A)' case the individual moisture channels are back filled with sand are unachievable even in a large landscape application of 100 trees due to economics, maintenance and complexity, this is similar to Skaife (U.S. Pat. No. 4,117,685 A), the complexity of using man-made water absorbent material in large scale agricultural applications the Skaife's art becomes impracticable.

The invented apparatus uses an approach in preventing downward percolation over a large areas by focusing the irrigation water into a set of close chambers within a conduit. The bidirectional liquid channel chamber acts as a subterranean water stream allowing irrigated water to travel bidirectional the full distance of the invented apparatus by gravity water equalization, thus without the need of producing water pressure with energy and without obstructions such as the dams used in Skaife. The second chamber known as the self-leveling saturated channel chamber, that is open at top to interact with the native soil. This second chamber is also describe as a subsurface trough that holds the irrigated water at the buried dept of the conduit. Obstruction liquid is allowed to pass between the two chambers by means of large opening bidirectional seep hole emitters that will not be block by soil, greywater scum or storm water turbidity. The invented apparatus conduit can be laid end on end up to 4 miles plus in length subsurface at near zero grade and run parallel to each other in order to blanket a large area. The conduit's bidirectional liquid channel is flushed with water in cycles to allow water to slowly seep through the bidirectional seep holes into the self-leveling saturated channel and up into the moisture zone above the self-leveling saturated zone. Each flushing cycle is preformed to keep the capillary fringe moist and available to the desire plants, but not over saturate the moisture zone to the point that gravity water is pulled past the invented apparatus. The moisture zone plume is held in place due to the concentrated focus of water molecules in the self-leveling saturated channel. The concentrates water molecules increase the natural adhesion and cohesion properties at the top of the self-leveling saturated channel keeping the moisture zone plume suspended above the self-leveling saturated zone. This suspended moisture zone plume will have strong cohesion properties until the moisture is uptake by the desire plants above. These strong cohesion properties are created by pushing out extra air molecules, thereby increasing the cohesion bonds and avoid gravity water lost to deep percolation. The moisture zone will shrink in size as water is uptake by plants, and till the next water cycle recharges the moisture zone thereby keeping a perpetual virtual suspended water table and accompanying capillary fringe (moisture zone plume).

Globally the world is experiencing high volume of unpredictable environmental climate fluctuations ranging from prolong extreme regional droughts, at other times server flooding from precipitation. There is a need for a climate smart soil moisture regulating apparatus that is multipurpose to address climate events such as irrigation during dry periods with traditional water sources or with alternative water sources such as untreated greywater when available. Other times be used as a drain tile pipe during saturated wet periods and/or a opportunistic water banking system for capturing surplus precipitation runoff when appropriate. When we look at similar subirrigation systems such as Byles (U.S. Pat. No. 5,374,138 A), Nalbandian et al (U.S. Application No. 2002/0017055 A1), Lichfield (U.S. Pat. No. 5,938,372 A), Zeman (U.S. Pat. No. 3,774,850 A), Reese (U.S. Pat. No. 4,060,991 A), Skaife (U.S. Pat. No. 4,117,685 A), and Horsley et al (U.S. Pat. No. 5,702,593 A) all are single purpose, unidirectional irrigation system. Meaning that each is design to apply water only and cannot be used to drain a field or lower the water table in a given area. Even one skilled in the art of irrigation delivery system could not use any of these prior arts in a bidirectional processes of irrigation and drainage landscape, nor would the emitter orifices allow bidirectional flow with the exception of the emitters in Nalbandian et al (U.S. Application No. 2002/0017055 A1) but in Nalbandian, the reverse flow capacity is limited to the capacity of the closed reservoir design and would not allow for discharge of the extra water from the growing area. In addition Byles, Nalbandian, Lichfield, Zeman, Reese, and Skaife are not capable of applying rain water runoff without pretreatment to clean turbidity.

The invented apparatus has the novel ability to be a subsurface irrigate apparatus during dry months with high water utilization efficiency, the ability to either add rain water runoff to the landscape soil for water banking or to act as a drain tile to remove water from the landscape when the water table rises too high or remove water when too much precipitation has saturated the landscape. Thus the innovative and novelty of the current apparatus is in its multipurpose functionality capabilities to manage water content within a soil structure thru the novel features of bidirectional seep holes and bidirectional liquid chamber that allow bidirectional obstruction liquid flow with high turbidity. The novel elements working together of the invented apparatus are the bidirectional seep hole emitters that are large in size to avoid blockage of obstruction liquid, the bidirectional liquid chamber, that allows bidirectional gravity flow and water equalization, for level free flow of water on and off landscapes.

When lands have been denied rain for extended periods of time the top soil develops a film of hydrophobic properties, also known as the development of soil surface tension. When this happens, there is little chance for light precipitation or sprinkler irrigation water to penetrate past the top ⅙ layer of soil. Thus during short precipitation events or sprinkler irrigation much of the water rolls right off the lands and into drainage channels. This is especial an issue for the first significant precipitation event also known as first flush rain event, where most of the containments that have built up on soil or on hard surfaces get wash off the landscape and into rivers and oceans where such contaminants can accumulate and present a negative environmental spike event. In Horsley et al (U.S. Pat. No. 5,702,593 A) we are taught "that the greatest pollution attenuation capabilities exist within the subsurface (the root zone)", Horsley innovation is design well as a compartmentalized modular commercial product, but the compartmentalize control closed wetlands is limited in the size and capacity even when multiply units are combined. In addition the Horsley's apparatus requires ongoing maintenance of the wetlands for anaerobic conditions and concentrated turbidity contaminants in the filter medium. Horsley's apparatus use of slotted pipes to distribute storm water runoff into the wetland system chamber would allow discharge gravity water to flow past the root zone if place in an open field, but in Horsley, the water is contained within a water-tight V-shaped basin therefor requiring maintenance due to prolong anaerobic conditions cause by the closed in wetlands inability to drain.

The invented apparatus is a means to avoid hydrophobic surface water tension during precipitation to deliver high volume turbidity storm water with contaminants in proximity of plants root zone for pollution attenuation, irrigation and water banking.

Many current irrigation systems are based on pressurized delivery of water. Pressurized water delivery systems give the ability to move water over landscapes with variable contours and distribute such water with high percent of distribution efficient uniformity with control emitter devices such as sprinklers or drip. Such pressurized water irrigation innovations have led to great advancements in both urban and agricultural landscapes. This path of using pressurized water continues today with many strategies in delivering precision irrigation to the desired plants. The pressurized water delivery approach, is focus on controlling the volume of water applied by controlling the water pressure and the orifice size on each emitter. The problem is that pressurized irrigation systems require large amounts of energy to pressurized the water lines. The energy production to supply pressurized irrigation systems is costly, in some areas hard to supply and, the production of energy compounds the global environmental crises by producing increase greenhouse gases during its production. This is further compounded by high water distribution efficient irrigation systems require very clean water to avoid clogging the emitter's orifices. Such clean water can only be achieved with the use of advance filter systems that use high water pressure to push the turbidity water through cleaning membranes. Thus these advance filter system require large amounts of energy to operate, are costly to purchase and require costly schedule maintenance. A pressurized system may have great advantages of water distribution efficiency and water utilization effectiveness, but the problem is they also require substantial investment, maintenance and, have high energy cost to operate. This puts much of these advance system out of the economic reach of poor farmers globally and out of the reach of any farmer without reliable and affordable energy sources. There is a wide variety of prior art using pressurized irrigation distribution systems such as Byles (U.S. Pat. No. 5,374,138 A), Lichfield (U.S. Pat. No. 5,938,372 A), Zeman (U.S. Pat. No. 3,774,850 A), Reese (U.S. Pat. No. 4,060,991 A), and Skaife (U.S. Pat. No. 4,117,685 A). In each case these past art use pressurized delivery systems with some valves, pressure regulators and specialize filters. In the case of Byles (U.S. Pat. No. 5,374,138 A), Lichfield (U.S. Pat. No. 5,938,372 A), Zeman (U.S. Pat. No. 3,774,850 A), and Skaife (U.S. Pat. No. 4,117,685 A) all use small orifices to deliver precision water, thus are subject to clogging by soil particles, mineral buildup, greywater scum if water is not highly clean by filters and are unidirectional.

The invented apparatus is a design as a bidirectional gravity flow and water leveling balancing system. Where water is transported by natural equilibrium balancing within the invented apparatus, similar to placing water in a level cookie sheet so it distributes is equally within the sheet. The term used for slop placement of the multipurpose bidirectional nonpressurized climate smart subirrigation apparatus in the soil is called, subsurface zero grade. Meaning the pipe does not tilt to any one direction even if the land surface has contours. For small applications such as urban landscape the placement at subsurface zero grade can be eyeballed and calibrated by filling the invented apparatus with water before backfilling and viewing the water equilibrium along the length of the invented apparatus. In larger agricultural applications, drainage tile placement equipment make it possible to keep subsurface zero grade over miles in length. Such companies as www.soilmax.com use Global Positioning Satellites (GPS) and Real Time Kinematic (RTK) to provided enhance precision position data on their trenching and drain tile laying equipment. Such drain tile installation systems can place subsurface drain tile up to 60 inches deep over contour landscape of up to 5 miles with little more than 3 centimeters differential over the length. It is the innovative method of using the invented apparatus at zero grade as a means of bidirectional nonpressurized gravity flow to cut energy use.

Clog emitter orifice are a significant problem even with a technology advance filtration system. The most common is when a pressurized system is turn off. Back flow of the water in the pipe distribution system can cause negative pressure that will suck in soil particle into the emitters orifice and wedge into the orifice thus preventing irrigation when the system is turn back on. In another common problem, is mineral build up. Water in general has a number of mineral elements, as water is push out a micro emitter these mineral elements start to collect around the orifice opening and eventually clogging the orifice, thus requiring one of three options: replacement, manual cleaning or an acid flush in the irrigation system to dissolve the elements. A third operational problem of emitters with small orifices, is in orchards and vineyards, where irrigation systems are turn on for up to three days at a time, then turn off for a week or more. During the off cycle small pest such as ants, slugs, spiders and other pest enter the system piping looking for water or new homes. These same pest clog up the irrigation system orifices with their dead bodies or eggs when the irrigation is restarted, thereby requiring visual inspection of each water distribution point in the whole system to make sure water is flowing out when the system properly. If not, then the labor options of replacement or manual cleaning are preformed. This is a significant drain on labor when 1,000 of acres are irrigated. In Byles (U.S. Pat. No. 5,374,138 A) the attempt is made to make the water flowing portion of the apparatus with pores small enough to prevent particles from the soil from entering thus not really addressing the issue and instead compounding the problem, In Nalbandian et al (U.S. Application No. 2002/0017055 A1) the use of geotextile cloth is used to protect the orifice openings, In Lichfield (U.S. Pat. No. 5,938,372 A) the use of "a plurality of orifices therein for the uniform delivery of water, each orifice being shielded from root encroachment by a unique water diffusion device" is used to protect back flow. In Zeman (U.S. Pat. No. 3,774,850 A) uses a orifices "conFIG.uration they have a plurality of dead end areas which to at least a degree tend to trap and hold sediment as water flows through flow passages", and in Skaife (U.S. Pat. No. 4,117,685 A) the use of a screen is used to protect the orifice opening from soil intrusion. In all the prior art listed Byles, Nalbaddian, Lichfield, Zeman and Skaife all demonstrate a need to prevent orifice blockage from back flow, but in each of the listed prior art the same small orifices is subject to internal clogging when using obstruction liquid from a water source such as a well, irrigation channel or untreated greywater.

The invented apparatus is a multipurpose gravity flow nonpressurized system therefor no forced backflow. The use of bidirectional seep holes allow bidirectional obstruction liquid flow thus obstruction liquid with large volume of soil particles, and untreated greywater can flow bidirectional into the self-leveling saturated channel and the bidirectional liquid channel. The large bidirectional seep hole emitters orifice and gravity flow installation method as a means to avoid orifice blockage from back flow or internal obstruction liquid delivery.

As water become scarce and water rationing increases in many areas, the use of alternative water sources is needed. Untreated greywater for landscape irrigations is a one of these great alternative, especially in urban areas where 50% of the potable water is used for landscape. The challenges are that the national and international plumbing code requires greywater irrigation should be applied subsurface, without a pressurized system and should be manage to avoid human contact. An additional challenge is that untreated greywater has a high percentage of turbidity cause by consumer products used in showers, baths and laundry. These included beauty products like shampoos, conditioners, face scrubs, soaps, and washing machine products like detergents, softeners and biproducts like clothing lint particles or soil particle from washed clothes. All of these add to the turbidity of the water and have a tendency to clog up traditional irrigation systems at the emitter orifice. We have also found that in all cases the soaps and detergents used daily build up a greywater scum also known as soap scum. Our research has found that not only are the small orifices clog from both soap and greywater scums, but when geotextile fabrics where used within the soil at or near the untreated greywater discharge point, the greywater and soup scum clog up the geotextile pores and would not allow water to disperse into the landscape. In Lichfield (U.S. Pat. No. 5,938,372 A) apparatus it is describe to be useful for distribution of greywater away from human contact. Lichfield uses "a plurality of orifices therein for the uniform delivery of water, each orifice being shielded from root encroachment by a unique water diffusion device" further describe as a fibrous material. This is used to protect back flow into the orifices and support distribution of water including greywater. What is not describe, is that this works with purified cleaned greywater only. If untreated greywater is used within Lichfield's innovation, the orifices and fibrous material would clog up from the greywater scum thus not allowing water to disperse within the soil. One skilled in the art of untreated greywater irrigations will also find that the orifice designed in the following arts would also clog with untreated greywater Byles (U.S. Pat. No. 5,374,138 A), Zeman (U.S. Pat. No. 3,774,850 A), Skaife (U.S. Pat. No. 4,117,685 A), in the case of Reese (U.S. Pat. No. 4,060,991 A), and Horsley et al (U.S. Pat. No. 5,702,593 A) both systems are closed channels and the bidirectional liquid channels will eventual become clogged with greywater scum. It is now apparent that clean greywater to the point of drinking water can be used in almost any current irrigation system. The opposite is true for untreated greywater with obstruction liquid that has high turbidity, such water needs a novel approach to utilize within an irrigation system. The common application of untreated greywater irrigation is mainly limited to catchment cisterns filled with mulch to feed trees or bushes. Greywater and Untreated Greywater is relatively a new field in irrigation innovation so prior art has not focus on applying untreated greywater with high turbidity through irrigation systems. Therefor there is a need to solve this irrigation distribution of an alternative water source.

The invented apparatus uses the novel method of a large bidirectional seep holes as a mean to maintain bidirectional communication of obstruction liquid with high turbidity to flow freely between the bidirectional liquid channel and self-leveling saturated zone. The use of a plethora of bidirectional seep holes and self-leveling saturated zone assure no one point of failure. Obstruction liquid can enter the self-leveling saturated zone from any of the bidirectional seep holes to create a water equilibrium saturated zone along the length of the invented apparatus. Once greywater is within the self-leveling saturated zone active microbial enzymes breaking down the greywater scum into elements that plants can use or are environmentally safe.

Many prior art around subsurface irrigation use soil additives and fabrics that are meant to distribution water efficiencies for both lateral and vertical movement Nalbandian et al (U.S. Application No. 2002/0017055 A1) teaches us about a special man-made mixture for increase capillary actions, Lichfield (U.S. Pat. No. 5,938,372 A) uses a man-made fibrous material, Reese (U.S. Pat. No. 4,060,991 A) uses the replacement of soil with sand as a distribution capillary material, and Skaife (U.S. Pat. No. 4,117,685 A) uses a man-made material with stronger water holding capabilities than soil called Vitera. In smaller scale applications such as planters, planter bed, grass turf and commercial nursery operations such soil modifications application are ideal and can be economical with the proper supply chain sources. Other sub-irrigation apparatus discussed in prior art Sheldrake et. al (U.S. Pat. No. 7,681,356 B2) and Ohlin (U.S. Pat. No. 8,491,223 B2) both address sub irrigation and the use of capillary action to moisten the surrounding subsoil through the use of wicking fabric. I have found that the fabric wicks will eventually need to be replace before the end of life on the liquid transport conduit that supports the wicks. Other interesting challenges with Sheldrake, Ohlin, Reese, Skaife and Nalbandian is that all four do not take into account water molecules adhesion and cohesion differential between the native soil and the modify soil or dispersion fabric material used in these prior arts. The adhesion and cohesion differential between the prior art apparatus materials and the natural soils will have strong hydrophobic layering conditions that will delay or even prevent water from moving from the apparatus disbursement material into the surrounding soil. This same effect happens when a commercially grown potted plant using custom growing soil blend is placed in soil. The plant shortly dies due to lack of water even if the surrounding area is wet. What has happened, is the water adhesion and cohesion is greater in the surrounding native soil than the potted plant soil so water does not flow into the potted plant growing soil. This change in soil composition is discussed in detail on a YouTube video from Gemblous Agro-Bio Tech call "Water Movement in the soil". Unless the whole growing area is going to possess the same growing media properties, a hydrophobic layering will occur. Therefor the economic and logistical feasibility of using what Nalbandian, Lichfield, Reese, Skaife, Sheldrake and Ohin is not achievable beyond 1,000 square feet. In addition man-made soil mixtures and materials also have short life of active growing material. Losing much of their growing nutrients and properties within a year or two at which the man-made soil mixture becomes dead. This is the result of no material to support an natural active living microbial life ecosystem for health plant growth. Thus there is a need for an irrigation system that can manipulate the water distribution movement of native soils as a sustainable growing practice for long term soil ecosystem health and cost effective.

The invented apparatus channelize the irrigation water into a concentrated subsurface channel trough describe as a anaerobic concentrated self-leveling saturated zone thereby creating in geological terms, a water table. The anaerobic concentrated self-leveling saturated zone is only exposed at the top to create what geologist call the capillary fringe from the water table. The concentrating of irrigation water in a anaerobic suspended saturated zone, produces strong adhesion characteristics of water molecules laterally towards the atmosphere, at the same time the cohesion properties of water molecules hold the rising moisture column in tight formation as atmospheric air particles are push out of the self-leveling saturated zone and moisture plume center. Great irrigated water distributions is achieved by the combination of the concentrating irrigated water in the saturated zone and the limited exposure at top both, thereby focusing a vertical capillary fringe first before lateral movement on homogeneous native soils.

Weed growth has been shown to compete for water and nutrients at the detriment of the desirable plants or crops: Fruit Tree Weed Control: Paul Vossen (University of California Cooperative Extension Sonoma County, cesonoma.ucanr.edu/files/27204.pdf) and Clover Management in Pecan Orchards: Lenny Wells (The University of Georgia Cooperative Extension, (http://athenaeum.libs.uga.edu/xmlui/bitstream/handle/10724/2335/b1360.pdf?sequence=1). Such studies have shown that weeds have contributed to stunting growth of the desire plants. This become an economic problem when stunted growth is equal to lower crop yields. For organic farming, weed growth contributes to increase labor cost for hand weeding. There is also an increase in weeds become resistant to herbicides. Therefor there is a need for an alternative solution to labor and herbicides. The ideal strategy for weed control is first to prevent weed seed germination and then water starvation of any weeds that have germinated. Surface irrigation like sprinklers, drip and near surface irrigation like buried drip irrigations all encourage weed seed germination so are not good weed determents. Near surface irrigation like Byles (U.S. Pat. No. 5,374,138 A) and Lichfield (U.S. Pat. No. 5,938,372 A) are intended to be installed near the grass root zone thus providing both surface moisture for weed seed germination and soil moisture near the surface for weed growth. One skilled in the art of irrigation will know that, Byles and Lichfield have limited depth capabilities due to their design and limited vertical capillary height. Zeman (U.S. Pat. No. 3,774,850 A) strategy is to suffocate weeds under the Zeman's art but does not have a solution for weeds growing beyond the prior art's foot print, Skaife (U.S. Pat. No. 4,117,685 A) states "weeds will be less of a problem and will not necessitate their removal since sufficient water will be available for the field crop" thus Skaife feels weeds growth is acceptable. Therefor many prior art in irrigation attempt to suppress weeds, but are limited by their design and irrigation method.

The invented apparatus method for weed suppression is to establish a suspended virtual water table 12 inches or more below the root zone, thereby avoiding moisture in the top 3 to 6 inches of the soil profile, thereby starving weeds and weed seeds of water. For orchards and vineyards this is achieved by burying the current apparatus at 36" to 60" in depth within the service rows of the crops. The capillary fringe moisture plume rise will be 24 inches to 30 inches in most soils and within range of the feeder roots of such crops but still 6 inches below the surface.

Most agricultural crops receive irrigation water from what is known as gravity water. Irrigation water that is applied on the soil surface and plants absorbing the water and it percolates and before it passes. In other words irrigation water that is just passing through the root zone and is not maintain within the root zone region. This traditional irrigation is managed by turning on the irrigation to a achieve an acceptable surface soil saturation volume to push the irrigated water pass the surface water tension and pass the resistance of air between the soil particles. Once a desire irrigation volume has been reached, the irrigation is then turn off to allow for plant uptake during the gravity water flow. This process creates a water feast and water famine cycle for plants. The idea alternative option is a consistent and constant water supply that plant can feed from, offering a continuous source of ideal growing conditions with water and nutrients carried by the water. Thus an ideal growing condition is a water table not at the root zone but with a capillary fringe within reach of the desire plants roots. In USDA Wetland Reservoir Subirrigation System (WRSIS) (Link to WRSIS Research: http://www.ars.usda.gov/Research/docs.htm?docid=14999) showed the manipulation of the natural water table showed crop yield increases for corn and soybeans respectively, were 30.8% and 26.0% during the drier growing season. The crop yields increases are achieved by bringing up the water table up and the capillary fringe moisture plume within reach of the desire crops roots. This is accomplish by moving water from a wetland reservoir and injecting into subsurface drainage tiles to bring the water table within the landscape up. A ingenious solution when the water table is near the surface to allow for water table manipulations. In agricultural areas where the water table is 50 feet to 300 feet below the surface or is not confined, making such manipulations unachievable due to the sheer volume of water needed to manipulate the water table. In another water manipulation strategy by: Guber, Andrey & Smucker, Alvin & Berhanu, Samuntreatedi & M. L. Miller, James. 2015 (Subsurface Water Retention Technology Improves Root Zone Water Storage for Corn Production on Coarse-Textured Soils. Vadose Zone Journal. 0 . . . 10.2136/vzj2014.11.0166). SWRT is design to halt gravity water in its progress to the water table by a subsurface polyethylene membranes installed within the soil profile. This in essence stops irrigation water and storm water from deep percolation by holding the gravity water within Subsurface Polyethylene Membranes Troughs (SPMTs). Excess water is allowed to overflow the (SPMTs) and continue to deep percolation. The gravity water that is retain within the SPMTs is allowed to maintain a capillary moisture plume available to the plants above. The research has shown crop corn increase of 174%. A few draw backs to this innovation are: The longevity of the SPMTs. is short lived if disturb by rodents, or human error of puncher; the application of surface water is still performed, there is a stated detrimental effect in the report when too much irrigation or storm water is applied to the landscape and; there is a limitation to field length since landscapes with contour would not allow for the insertion of the SPMT at zero grade; and SPMT only captures gravity water that is applied over the SPMT thus losing the remaining to percolation.

The invented apparatus improves on both of WRSIS and SWRT prior art with a unique approach of creating a manmade suspended virtual water at a desire soil depth that is below the root zone to avoid root from entering the virtual water table, but close enough that the idea growing conditions of a capillary fringe moisture plume are available for the intended desire plants. It is the capillary fringe moisture plume that produces the ideal soil water moisture content with the correct parts of air, water and soil for ideal growth. If plants where to directly engage with the virtual water table they would die from over watering or cause lower production. Thus the optimal growing condition is a virtual water table depth that allows the desire plants to act like phreatophytes and send roots to a desire depth for ultimate nourishment of water, air and soil for outstanding growth. The current apparatus unique method of creating a virtual water table is made possible in part from the development of GPS and RTK technology that allows for the installation of the invented apparatus end on end for up to 4 miles plus with a variance of 3 cm along the length. The gravity flow and water equalization leveling design allows for bidirectional obstruction liquid flow with high turbidity during dry periods, removing water during overly saturated periods of precipitation and a combinations of both when using storm water for irrigation water or water banking. When the invented apparatus is laid in parallel to each other, one is able to create a blanked virtual water table across the landscape with ebb and flow capabilities by allowing water to flow into the landscape or draining water from the landscape. Thereby the bidirectional water equalization leveling is a means of managing a virtual water table.

SUMMARY

There for it is the primary objective of this invention too:

It is, therefore, a primary object of this invention to provide a multipurpose bidirectional nonpressurized climate smart subirrigation apparatus that can assist farmers in managing soil moisture content by managing a virtual water table for subsurface irrigation during dry periods, a water retention apparatus to prevent deep gravity water percolation and also be used as a drainage apparatus when landscapes have received too much water.

In is another objective of this invention to provide a multipurpose bidirectional nonpressurized climate smart subirrigation apparatus that can also be used to distribute alternative obstruction water with high turbidity and pollutions such as first flush storm water, untreated greywater, river run off or other alternative waters with high turbidity.

It is another object of this invention to provide a multipurpose bidirectional nonpressurized climate smart subirrigation apparatus to mimicking a natural water table and accompany capillary fringe moisture plume.

It is another objective of this invention to provide a gravity flow, water equalization leveling, multipurpose bidirectional nonpressurized climate smart subirrigation apparatus using no water pressure for the delivery of irrigation water and allow removal of excess water, thus eliminating the need for energy to operate.

It is another objective of this invention to provide a multipurpose bidirectional nonpressurized climate smart subirrigation apparatus that eliminates the common problem of clog emitters with small orifices in an irrigation system thereby making them more reliable with all types of water including obstruction liquids such as first flush storm water, untreated greywater, water with high mineral content or high turbidity.

It is another objective of this invention to provide a multipurpose bidirectional nonpressurized climate smart subirrigation apparatus that utilizes the manipulations of native soil as its water capillary distribution medium for affordable deployment worldwide.

It is another objective of this invention to provide method of using a multipurpose bidirectional nonpressurized climate smart subirrigation apparatus to eliminates surface water and surface moisture to conserve water, prevent weed seed germination, weed growth, fungi growth thereby eliminating need for fungicides, herbicides and a solution for weeds resistant to herbicides.

BRIEF DESCRIPTION OF THE SEVERAL VIEWS OF THE DRAWING(S)

These and other feature and advantage of the present invention will be better understood by reference to the following detail description when considered in conjunction with the accompanying drawings, wherein.

BEST MODE OF CARRYING OUT INVENTION

Figure 1:
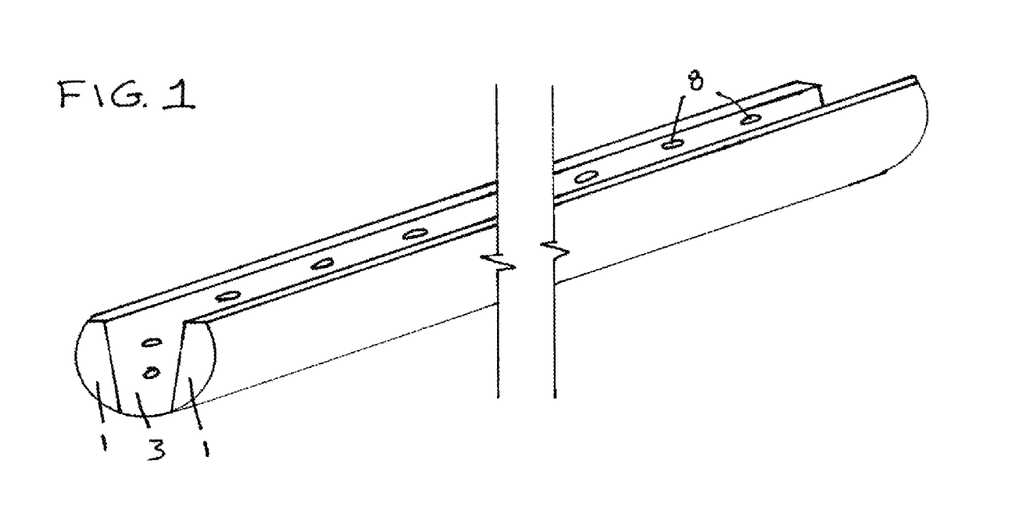
FIG. 1: Is a perspective view of one embodiment of the invention showing all the key elements of the multipurpose bidirectional nonpressurized climate smart subirrigation apparatus.

The present invention relates to an multipurpose bidirectional nonpressurized climate smart subirrigation apparatus for moisture control in a landscape and method of creating a virtual water table at a desire depth that can be many feet above the natural water table. The multipurpose bidirectional nonpressurized climate smart subirrigation apparatus can also be used with obstruction liquids such as a untreated greywater, untreated storm or field drainage water. FIG. 1 shows a perspective view of one embodiment of the multipurpose bidirectional nonpressurized climate smart subirrigation apparatus. Which is installed below the surface FIGS. 7, 8, 9, 10 and 11 within any native surrounding soil type to create a saturated zone 5 also known as a anaerobic saturated zone within a self-leveling saturated channel 2 at the buried depth of the multipurpose bidirectional nonpressurized subsurface irrigation conduit apparatus. Whereby creating a capillary moisture plume or a moisture zone 6 starting at the top of the saturated zone 5 and continuing several inches above said saturated zone FIG. 7.

Figure 2:
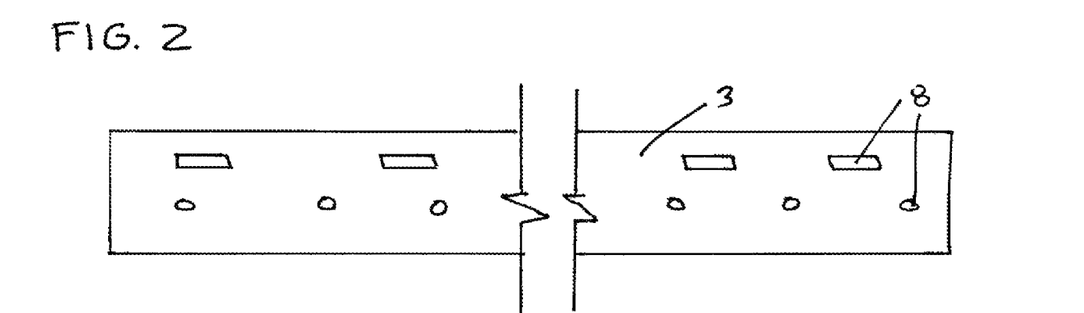
FIG. 2: Is a side full length cross-section of the FIG. 1 embodiment showing the different shapes of bidirectional seep holes along the shared bidirectional seep hole wall of the bidirectional liquid chamber conduit and the soil retention self-leveling saturation channel.

FIG. 2 is a cutaway view along the length of the multipurpose bidirectional nonpressurized subsurface irrigation conduit apparatus in FIG. 1, showing a plurality of bidirectional seep holes 8 size types along a bidirectional shared seep hole wall 3.

Figure 3:
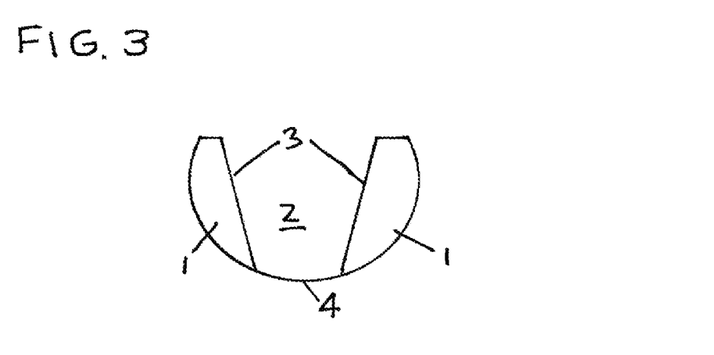
FIG. 3: Is a front cross-section of the FIG. 1 embodiment showing three distinct channels, two for the bidirectional liquid channel chambers to transport bidirectional gravity water flow and the center self-leveling saturated channel that confines and concentrates the saturated soil and supports the water equalization leveling along the length of the invention.

FIG. 3 is a front view of the multipurpose bidirectional nonpressurized subsurface irrigation conduit apparatus embodiment in FIG. 1 showing the full profile of the different channels. FIG. 3 embodiment shows a bidirectional liquid channel chamber 1 on each side of the conduit, that allows liquid to flow bidirectionally the full distance of the conduit with no obstructions. The center channel is the self-leveling saturated channel 2, that is exposed at the top to focus vertical water capillary movement upward to transform the dry soil above into said moisture zone 6 plume also known as said capillary fringe moisture plume. The shared bidirectional seep hole walls 3 have the plurality of large bidirectional seep holes 8 to allow water and particles to communication between the bidirectional liquid channel chambers 1 and the self-leveling saturated channel 2. The constant flow of water into the self-leveling saturated channel 2 transforms the dry soil in the self-leveling saturated channel 2 to the saturated zone 5. The saturated zone 5 is technical a anaerobic virtual water table that is closer to the surface than the natural occurring water table. For maximum effectiveness of water molecules adhesion and cohesion only the local native soil should surround the irrigation conduit apparatus and fill the self-leveling saturated channel. The multipurpose bidirectional nonpressurized subsurface irrigation conduit apparatus FIG. 1 can be made with plastic extrusion process or metal extrusion process. An impermeable exterior wall 4 and the shared bidirectional seep hole wall 3 can vary in thickness, depending on the downward weight load needs above the buried multipurpose bidirectional nonpressurized subsurface irrigation conduit apparatus.

Each multipurpose bidirectional nonpressurized subsurface irrigation conduit apparatus segment length and diameter can be customized for each industry. For residential Do It Yourself application approximate 10 foot or 3-meter length by 3.5 inch diameter would be idea. 10 foot sections are easy to carry the multipurpose bidirectional nonpressurized subsurface irrigation conduit apparatus on top of a car and the 3.5 inch diameter is idea for urban landscape. In agricultural applications rolls up to 300 feet or 100 meters are idea for semiautomatic installation in the field with diameters up to 6.5 inch to manage large volumes of water. Wall type and thickness of the apparatus is dependent on the end use industry and application. For homeowners ridged pipe is idea, but for agriculture a corrugated wall structure or a pliable wall allows for automatic installation of the invented apparatus by current specialize drain tile installation equipment.

Figure 4:
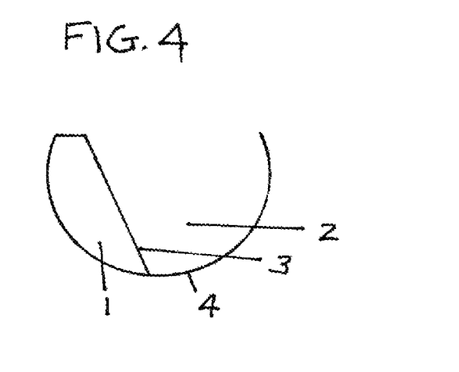
FIG. 4: Is a front cross section of an alternative embodiment showing the multipurpose bidirectional nonpressurized climate smart subirrigation apparatus utilizing one bidirectional liquid channel chamber for bidirectional gravity water flow and one self-leveling saturated channel for soil saturation.
Figure 5:
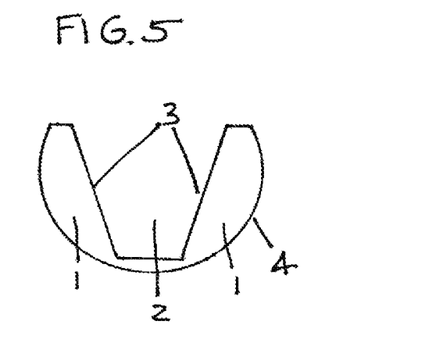
FIG. 5: Is a front cross section of an alternative embodiment showing the multipurpose bidirectional nonpressurized climate smart subirrigation apparatus utilizing one "U" shape wrap around bidirectional liquid channel chamber for bidirectional water flow and one center self-leveling saturated channel for soil saturation concentration and confinement.

Referring to FIG. 4 and FIG. 5 are both alternative embodiments of the multipurpose bidirectional nonpressurized subsurface irrigation conduit apparatus, both having a minimum of two channels that run parallel to each other along the full length of the invented apparatus. At least one channel is dedicated as said bidirectional liquid channel chamber 1 to allow bidirectional gravity water to flow along the length of the invented apparatus with no obstruction. The second channel is said self-leveling saturated channel 2 running the length of the conduit. Said self-leveling saturated channel 2 holds the irrigated water like a cup allowing the irrigation water to concentrate till the backfilled soil in said self-leveling saturated channel 2 has become fully saturated, creating the saturated zone 5 within the area of said self-leveling saturated channel 2.

Water tables or aquifers are technically defined as fully saturated zones, so by definition the apparatus is creating a water table, hereon referred to as a virtual water table at the depth along the full length of each said self-leveling saturated zone 5. Said self-leveling saturated channel 2 contains and concentrates the irrigated water to create a virtual water table is a key useful feature of the multipurpose bidirectional nonpressurized subsurface irrigation conduit apparatus. Said self-leveling saturated channel 2 is open at the top to allow the surrounding soil 10 to backfill into the full inside area of said self-leveling saturated channel FIG. 9 when buried. Said self-leveling saturated channels bottom and wall(s) that are not said bidirectional shared seep hole wall(s) 3 with the bidirectional liquid channel chamber 1 are impermeable exterior walls 4, so as to contain and thus concentrate the irrigation water FIG. 7 and prevent a deep percolation 9 of the irrigation water to occur below the buried apparatus FIG. 7. By only having the top of said self-leveling saturated channel 2 open to the surrounding soil 10, the water adhesion and cohesion forces are focuses vertically upward capillary movement. Whereby creating said moisture zone 6 many inches above the self-leveling saturated zone FIG. 7.

The two channels types work together by allowing water to bidirectional pass from the bidirectional liquid channel chamber 1 to said self-leveling saturated channel 2 through the plurality of large bi-directional seep holes 8 that are placed along the shared bidirectional seep hole wall 3 between said self-leveling saturated channel 2 and the bidirectional liquid channel chamber 1. The plurality of bidirectional seep holes 8 can be circular or other shape such as oblong or rectangle FIG. 2. The plurality of bidirectional seep holes 8 size is dependent on the local water quality and soil types. The guidelines are that plurality of bidirectional seep holes 8 size is large to prevent clogging and in some cases to allow bidirectional obstruction liquid flow so the multipurpose bidirectional nonpressurized subsurface irrigation conduit apparatus can be used for drainage.

When untreated greywater is used in the multipurpose bidirectional nonpressurized subsurface irrigation conduit apparatus, the plurality of bidirectional seep holes 8 size is recommended to be ¼ inch or larger to prevent soap scum buildup or clogging from lint and other material in the untreated greywater.

Spacing of the plurality of bidirectional seep holes 8 range depending on the soil type. Clayish soils require closer spacing such as one to three inches, and sandy soils can be as far as three feet. The plurality of bidirectional seeping holes 8 are always open FIG. 9, to allowing continuous bicommunication of water and particles between the bidirectional liquid channel chamber and said self-leveling saturated channel, thus maintaining a liquid equilibrium leveling in the saturated soil zone 5 along the full length of said self-leveling saturated channel 2. The soil in said self-leveling saturated channel 2 creates enough resistance to allow for the nonpressurized water to flow the full distance of the multipurpose bidirectional nonpressurized subsurface irrigation conduit apparatus. Any soil that blocks the plurality of bidirectional seep holes 8 or enters into the bidirectional liquid channel 1 will not affect the performance since soil is a permeable material that water will pass through and other bidirectional seep holes will allow communication to the self-leveling saturation channel.

Figure 7:
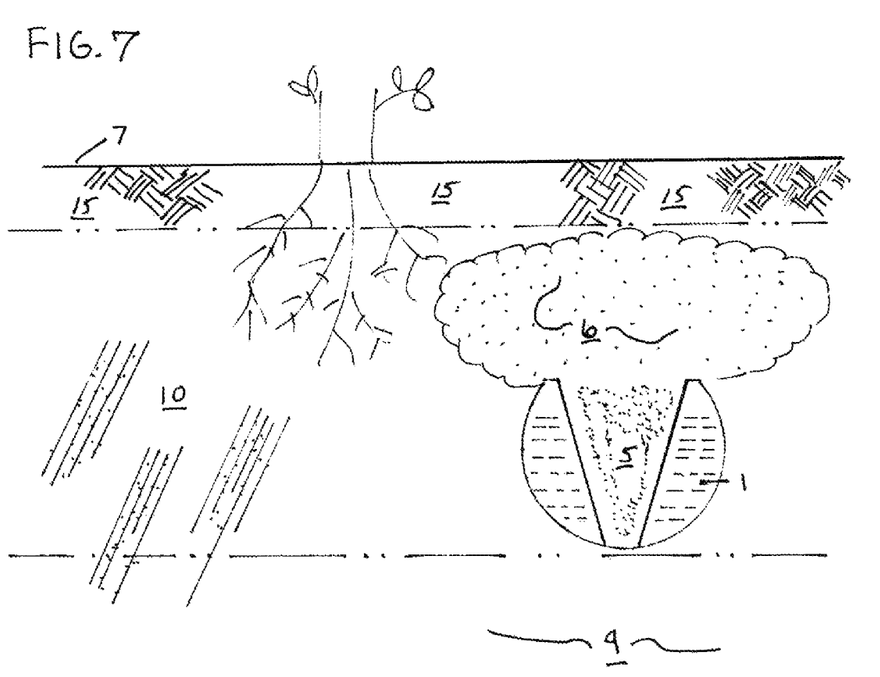
FIG. 7: Is the front cross section of the multipurpose bidirectional nonpressurized climate smart subirrigation apparatus in use underground for irrigation.

Referring to FIG. 7 shows roots extending down into the surrounding soil 10 above the Multipurpose bidirectional nonpressurized subsurface irrigation conduit apparatus. The apparatus shows water in the bidirectional liquid channel chamber 1, the soil saturated zone 5 created within said self-leveling saturated channel 2 and the focus water adhesion and cohesion capillary movement creating the capillary fringe moisture zone 6 plume. Since the impermeable exterior wall 4 of the apparatus prevents downward and sideways water migration, the irrigation water is contained and concentrated in said self-leveling saturated channel 2. The impermeable exterior wall 4 also prevents water loss to deep percolation 9 where the depth is too far below the roots to access. The focus capillary actions of water adhesion and cohesion from the saturated zone 5 causes the creation of the moisture zone 6 plume above the saturated zone 5 is a key useful benefit of the present invention.

Referring to FIG. 7 shows a soil solar vaporization zone 15 that can be several inches deep and is subject to unwanted soil solar vaporization 11. The buried depth of the apparatus should be deep enough to avoid said soil solar vaporization zone 15. Keeping said soil solar vaporization zone 15 dry has the additional benefit of avoiding weed germination and/or extra moisture around plants that can cause fungus growth. Different soil types will respond differently, so the soil solar vaporization zone 15 depth will be conditional on the native soil type at the apparatus installation site.

Figure 8:
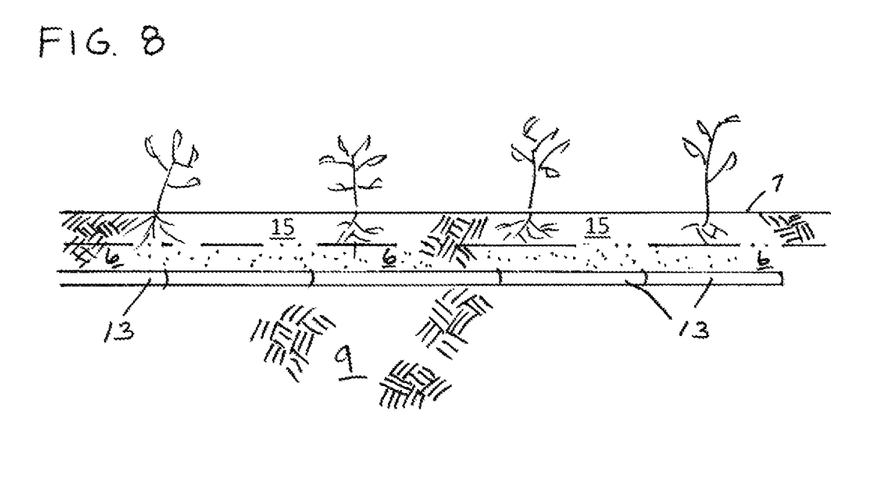
FIG. 8: Is multiple segments connected in series of the multipurpose bidirectional nonpressurized climate smart subirrigation apparatus in use for underground irrigation.

Referring to FIG. 8, the invented apparatus can be connected in series end on end 13 to create any desirable length in excess of 4 miles long if needed. The invented apparatus is intended to operate by gravity flow and water equilibrium leveling. The liner design of the invented apparatus allows for installation at a subsurface zero grade level over long distances with existing technology. When installed at subsurface zero grade, water will flow across the full length of the apparatus evenly, creating water equilibrium. The zero grade prevents water from puddling within said self-leveling saturated channel 2 or to overflow at low points along the length of the apparatus. Lengths of the apparatus over 50 feet can be preform with agricultural equipment design to install subsurface drain pipe within centimeters of subsurface grade over 5 miles' lengths, such equipment is standard in the agricultural drainage industry.

Figure 10:
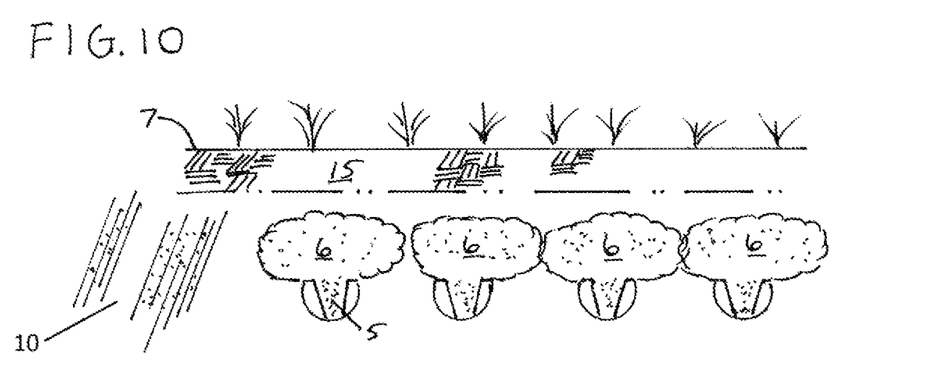
FIG. 10. Is a cross section of an open field crop or turf area, showing the multipurpose bidirectional nonpressurized climate smart subirrigation apparatus place in parallel to provide even subsurface irrigation coverage by creating a blanket moisture zone across the field FIG. 11. Is a cross section of an open orchard crop, showing the multipurpose bidirectional nonpressurized climate smart subirrigation apparatus place in parallel between the row of trees to provide subsurface irrigation.

Referring to FIG. 10 large field irrigation is performed by placing the invented apparatus lengths parallel to each other FIG. 10 as a means to create interconnected moisture zones 6. Interconnected moisture zones as a means of forming an interconnected blanketed moisture zone across the field width FIG. 10. Irrigation times can be frequent as a mean to create vertical height of the interconnected blanketed moisture zone or reverse, irrigation cycles can be spread out over time as a mean of creating a shallow or deeper interconnected blanketed moisture zone that is closer to said multipurpose bidirectional nonpressurized subsurface irrigation conduit apparatus. Each lateral length is gravity feed water by connecting to standard irrigation headend canal or feeder pipe and each lateral is terminated by either a cap, a drainage pipe or drainage canal.

Figure 11:
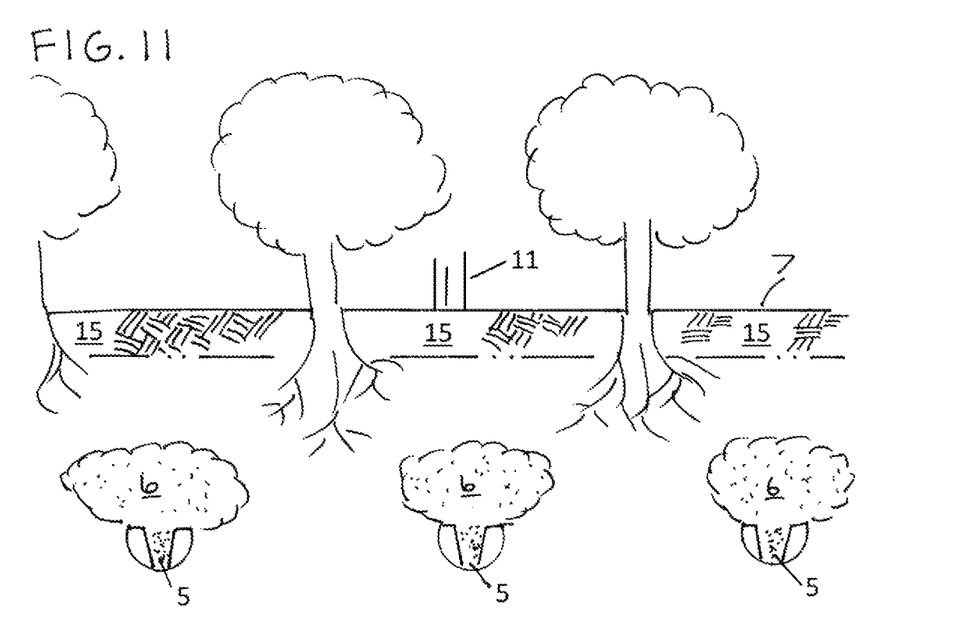

The parallel distance FIG. 10 between each series lateral will be determine by the type of soil and the plants being irrigated. For row crops spacing is close and approximately three feet on center. FIG. 11 is an example of orchard spacing. The apparatus can be place in the center of each orchard row with a spacing of nine feet up to twenty-seven feet on center, depending on orchard type and orchard row spacing. For turf applications, the spacing can range from two feet up to four feet on center depending on soil type.

Figure 6:
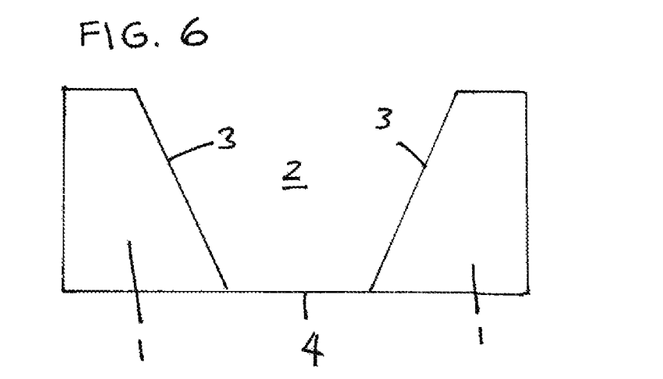
FIG. 6: Is a front cross-section of an alternative embodiment showing that the multipurpose bidirectional nonpressurized climate smart subirrigation apparatus does not need to be round in shape. Two bidirectional liquid channel chambers with one center self-leveling saturated channel for soil saturation concentration and confinement.

Referring to FIG. 4, FIG. 5 and FIG. 6 each showing a different embodiment shapes and channel conFIG.uration of the present invention. The diameter, width and high of each embodiment is dependent on the multipurpose bidirectional non-pressurized subsurface irrigation, drainage and storm water capture application, plus manufacturing extrusion process. For Landscape applications the diameter of the irrigation conduit apparatus is within three and half inches in width and for agriculture applications this width is above three and half inches.

Referring to FIG. 4 the invented apparatus is extruded to have one said bidirectional liquid channel chamber 1, and one said self-leveling saturated channel 2 for saturated soil containment and one said shared bi-directional seep hole wall 3.

Referring to FIG. 5 the multipurpose bidirectional non-pressurized subsurface irrigation conduit apparatus is extruded to have one bidirectional liquid channel chamber 1 in a wraparound "U" design so as to give said self-leveling saturated channel 2, two shared bidirectional seep hole walls 3 to place the plurality of bidirectional seep holes 8 in, only the shared bidirectional seep hole walls 3 have the plurality of bidirectional seep holes 8 to allow water to bicommunicate between the bidirectional liquid channel chamber 1 and the self-leveling saturated channels 2, all other external areas are impermeable exterior walls 4 to contain and concentrate the water and prevent deep percolation 9 or lateral water adhesion and cohesion.

Referring to FIG. 6 the multipurpose bidirectional non-pressurized subsurface irrigation conduit apparatus is extruded in a rectangular shape to allow a wider said self-leveling saturated channel 2 and greater bidirectional water flow along the bidirectional liquid channel chambers 1, the bidirectional shared seep hole walls 3 are on both sides with a plurality of bidirectional seep holes 8 in each shared bidirectional seep hole wall 3. All other walls are considered impermeable exterior walls 4.

Some embodiments of the irrigation conduit apparatus can have the same outside diameter as standard PVC or ABS pipe so that standard PVC and ABS couplers can be used to interconnected the apparatus in series 13 for the desire lengths or to connect to existing irrigation supply lines. Using standard PVC and ABS diameter sizes allows for easy adapting to existing water infrastructure sources.

Figure 9:
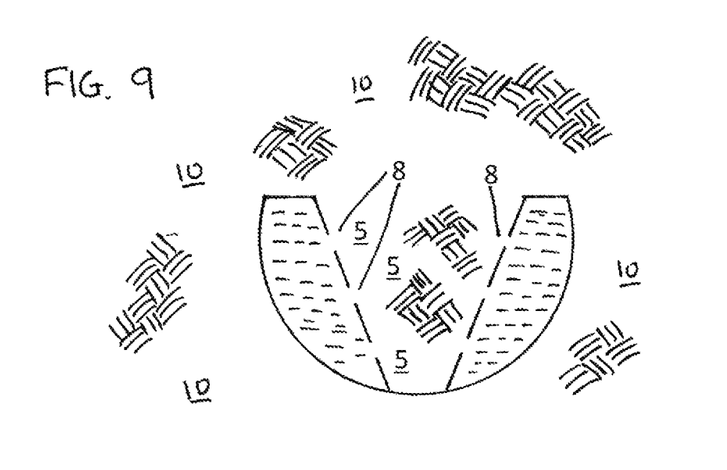
FIG. 9: Is a frontal cross cut section of the multipurpose bidirectional nonpressurized climate smart subirrigation apparatus showing the seep holes and the backfilled native soil into the saturated channel.

Referring to FIG. 9 The top of said self-leveling saturated channels 2 is open at the top, to allow direct back fill of the surrounding native soil 10 into said self-leveling saturated channel 2. The soil in said self-leveling saturated channel 2 and the soil above the self-leveling saturated channel 2 should be the same for greater adhesion and cohesion properties, thus greater vertical capillary movement. Water molecules in the self-leveling saturated channel 2 are concentrated at the top of the self-leveling channel so will have a tenancy to move vertically upward into the above surrounding soil 10 through water molecule adhesion and cohesion properties whereby FIG. 7 creating a moisture zone 6 plume many inches in height above the conduit apparatus. Current install applications are showing vertical movement of at less 22 inches in clayish soils. The moisture zone 6 plume will have a mixture of air and water at perfect conditions for plant roots to uptake water. Plant roots will avoid the self-leveling saturated zone 5 due to lack of air, thus preventing root intrusion into the apparatus. Any soil that enters into the apparatus bidirectional liquid channel chamber 1 will not clog the bidirectional channel chamber since soil is porous and can be flush out seasonally.

Referring to FIG. 10 and FIG. 11, the invented apparatus can be buried at different depths depending on the plants to irrigate. The deeper the installation the less soil solar vaporization and surface moisture 11. The guidelines are to bury at the plants root zone or up to 24 inches below the root zone FIG. 11. Capillary water adhesion and cohesion actions will convey the irrigated water from said saturated zone 5 to a moisture zone 6 plume, which is an area that plants roots can access. Depth will vary depending on the native soil types at each installation location.

The irrigation conduit apparatus meets the needs of untreated greywater irrigation by avoiding surface irrigation. Many current government regulations allow for the use of untreated greywater irrigation, but only if the untreated greywater is applied by subsurface irrigation methods. Untreated greywater has a tendency to have non-water elements such as lint, hair, soaps and detergents that can cause clogging with traditional pressurized irrigation micro emitters. The apparatus avoids this with the use of the plurality of bidirectional seep holes 8 that are large in diameter and/or length.

In yet a further embodiment, the invention is used as a means of a multipurpose non-pressurized climate smart irrigation conduit apparatus for irrigation, water retention, storm water treatment and drainage to provide: 1) field drainage during excessive wet periods, 2) drainage of rising water table areas, 3) water capture and retention in times of surface percolation water, 4) subsurface irrigation system during dry periods, 5) alternate irrigation water delivery such as untreated greywater and 6) storm water runoff diversion for irrigation and treatment. The plurality of large bidirectional seep holes 8 will allow bidirectional communication of liquid between the bidirectional liquid channel chamber 1 and said self-leveling saturated channel 2. The apparatus system placement in the field should be at the desire water table depth taking into account the capillary vertical rise. If used as a mean for drainage an additional geotextile material can be place over the bidirectional seep holes as a mean to prevent soil eroding into the plurality of seep holes.

In a further embodiment, the irrigation conduit is used as a means to cut weed growth by denying weeds surface 7 water to germinate seed or water in the soil solar vaporization zone 15. This embodiment is useful to avoid herbicides use on organic farming and as solution for weeds resistant to herbicides.

If a further embodiment the irrigation conduit is used as a means to cut fungicide use by eliminating surface water and its contribution to creating dewing on leaves that leads to fungi growth.

While the invention has been described in detail with particular reference to exemplary embodiments thereof, the exemplary embodiments describe herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "zone", "exterior", "shared", "soil", "large" and similar terms have been used baring to describe a spatial relationship of one element to another, it is understood that these terms are intended to encompass different orientations of the various elements and components of the device in addition to the orientation depicted in the figures. Moreover, the figures contained in this application are not necessary drawn to scale.

Having thus fully described my invention what I claim as new and desire to secure by Patent is:

1. A subsurface irrigation system for creating a water table at a desired depth, said system comprising:
   an exterior wall formed of a water impermeable material;
   a first seep hole wall having a top portion and a bottom portion, the top portion connected to the exterior wall and extending in the horizontal direction and the bottom portion extending downwardly from the top portion, with the bottom portion connecting to the exterior wall and thereby forming a bidirectional channel chamber, between the exterior wall and the first seep hole wall, configured to allow water to pass freely bidirectionally along the length of the bidirectional channel chamber,
   a second seep hole wall having a top portion spaced from the top portion of the first seep hole wall and connected to the exterior wall and a bottom portion spaced from the bottom portion of the first seep hole wall and connected to the exterior wall such that first and second seep hole walls are spaced from each other along the entire length of the first and second seep hole walls, the second seep hole wall connected to the exterior wall along the top portion of the second seep hole wall;
   a self-leveling saturated channel formed by the first seep hole wall and the second seep hole wall, wherein a bottom of the self-leveling saturated channel is formed of the bottom portions of the seep hole walls and the exterior wall;
   a plurality of bidirectional seep holes formed in the bottom portion of the first seep hole wall, said plurality of bidirectional seep holes being large enough to allow liquid communication between the self-leveling saturated channel and the bidirectional channel chamber; and
   a plurality of bidirectional seep holes formed in the second seep hole wall, said plurality of bidirectional seep holes being large enough to allow liquid communication between said self-leveling saturated channel and the bidirectional channel chamber.

2. The subsurface irrigation system of claim 1, wherein the self-leveling saturated channel is saturated with water and the water in the bidirectional channel chamber flows freely.

3. The subsurface irrigation system of claim 2, wherein the self-leveling saturated channel is buried near plants having a root zone and is buried at least 12 inches below the root zone to prevent water lost to surface evaporation and soil solar vaporization.

4. The subsurface irrigation system of claim 3, wherein the self-leveling saturated channel is filled with water to create a water saturation zone in the saturated channel and to create a water moisture zone in the root zone.

5. The subsurface irrigation system of claim 4, wherein the water moisture zone is buried deep enough to eliminate weed seed germination and weed growth.

6. The subsurface irrigation system of claim 5, wherein the exterior wall is buried in parallel with other sections of exterior walls with respective self-leveling saturated channels, to provide an interconnected virtual water table across a field and prevent water percolating below the exterior walls.

\* \* \* \* \*